United States Patent [19]

Hasegawa

[11] Patent Number: 4,503,834
[45] Date of Patent: Mar. 12, 1985

[54] FEEDBACK CONTROL SYSTEM FOR SUPPLYING A FLUID TO AN APPARATUS OPERABLE WITH THE FLUID

[75] Inventor: Shumpei Hasegawa, Niiza, Japan

[73] Assignee: Honda Giken Kogyo Kabushiki Kaisha, Tokyo, Japan

[21] Appl. No.: 584,566

[22] Filed: Feb. 29, 1984

[30] Foreign Application Priority Data

Mar. 18, 1983 [JP] Japan ............... 58-045777

[51] Int. Cl.³ .................................. F02M 7/00
[52] U.S. Cl. .................................... 123/589
[58] Field of Search ............... 123/589, 587, 585, 344; 261/45, 54

[56] References Cited

U.S. PATENT DOCUMENTS

| | | | |
|---|---|---|---|
| 4,083,341 | 4/1978 | Brettschneider et al. | 123/589 |
| 4,091,783 | 5/1978 | Laprade et al. | 123/589 |
| 4,192,140 | 3/1980 | Yamashita et al. | 123/589 |
| 4,376,427 | 3/1983 | Mizono | 123/589 |

FOREIGN PATENT DOCUMENTS 2315004  1/1977  France ............... 123/589

Primary Examiner—William A. Cuchlinski, Jr.
Attorney, Agent, or Firm—Pollock, Vande Sande and Priddy

[57] ABSTRACT

A feedback control system for controlling the amount of a fluid to be supplied to an apparatus such as an internal combustion engine, in accordance with a detected result of the operational state of the apparatus, including a control valve for adjusting the amount of the fluid in response to a pressure applied to a pressure chamber thereof, is provided with an accumulator in at least one of a first pressure passage for supplying a first control pressure to the pressure chamber of the control valve and a second pressure passage for supplying a second control pressure to the pressure chamber of the control valve, to realize a pneumatic type PI operation of the fluid supply control.

7 Claims, 6 Drawing Figures

FEEDBACK CONTROL SYSTEM FOR SUPPLYING A FLUID TO AN APPARATUS OPERABLE WITH THE FLUID

BACKGROUND OF THE INVENTION

1. Field of the Invention

The present invention relates to a feedback control system for controlling the amount of a fluid supplied to an apparatus operable with the fluid such as an internal combustion engine whose operational state varies with the amount of the fluid supplied thereto.

2. Description of Background Information

In an internal combustion engine, for example, a fuel supply control device such as a throttle valve and a carburettor is provided to the air induction system for automatically supplying a suitable amount of the fuel according to the operational state of the engine, so as to obtain a desirable operation of the engine by adjusting the amount of the fuel supplied, in the fluid form, per unit time to the engine. However, from the view point of the emission control, it is difficult to always realize the optimum air/fuel ratio by only utilizing the conventional fuel metering system made up of the throttle valve and the carburettor unit. Therefore, an air intake side secondary air supply system is utilized as the feedback control system of the amount for adjusting the amount of the supply fluid, in which a secondary air passage communicated with the downstream side of the throttle valve for example, is provided and the amount of the secondary air is controlled in response to engine parameters so as to provide more precise adjustment of the air/fuel ratio.

As an example of this type of air intake side secondary air supply system, the applicant has already proposed an air/fuel ratio control system in which an air control valve whose sectional area is variable with the pressure of the fluid applied to a pressure chamber thereof, is provided in the secondary air supply passage, the actual air/fuel ratio is measured by detecting the oxygen content in exhaust gas, a first control pressure for opening the air control valve is applied to the pressure chamber so as to gradually increase the sectional area of the passage when the air fuel ratio is rich, and a second control pressure for closing the air control valve is applied to the pressure chamber so as to gradually decrease reduce the sectional area of the passage when the air/fuel ratio is lean, whereby performing the air/fuel ratio control by integral operations of the pneumatic type. This fluid supply amount control system of pneumatic type is advantageous in that the response characteristic to a fluid supply command is relatively good.

On the other hand, it is known in the art that the so called PI operation, that is, a combination of the proportional operation and the integral operation is preferable in the case of the feedback control system of the fluid supply amount, for improving the response and stability characteristics.

Therefore, in certain air intake side secondary air supply systems of the conventional thechnique which have a function of the PI operation for the air/fuel ratio control, a needle type valve driven by a pulse motor for varying the sectional area of the passage is provided to the secondary air passage, and the rotation of the pulse motor is electronically controlled in accordance with engine parameters.

However, the control circuit for this pulse motor necessarily includes an integration control circuit and a proportional control circuit, and consequently there was a problem of cost up due to rather complicated circuit construction thereof. Further, the same problem existed also in other various feedback fluid supply control systems.

SUMMARY OF THE INVENTION

An object of the present invention is therefore to provide a fluid supply amount feedback control system capable of the pneumatic PI operation with a relatively simple construction.

According to the present invention, a fluid supply amount feedback control system includes a detection means for generating a signal indicative of an operational condition of an apparatus to be controlled, for instance, an internal combustion engine, a fluid pressure responsive valve disposed in a supply passage of a fluid to be supplied to the apparatus, for varying the sectional area of the supply passage in accordance with the pressure of a fluid applied to a pressure chamber thereof, a source of first control pressure for generating a first control pressure, a source of second control pressure for generating a second control pressure, a communication means for supplying the first control pressure to the pressure chamber via a first pressure passage when the output signal level of the detection means is in a first level, and supplying the second control pressure to the pressure chamber via a second pressure passage when the output signal level of the detection means is in a second level, a first orifice provided in the first pressure passage, a second orifice provided in the second pressure passage, in which an accumulator is provided in at least one of a part of the first pressure passage on the side of the pressure chamber from the first orifice and a part of second pressure passage on the side of the pressure chamber from the second orifice, to provide a pneumatic control of the PI type for controlling the fluid supply amount to the apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein.

DETAILED DESCRIPTION OF THE PREFERRED EMBODIMENTS

Figure 1:
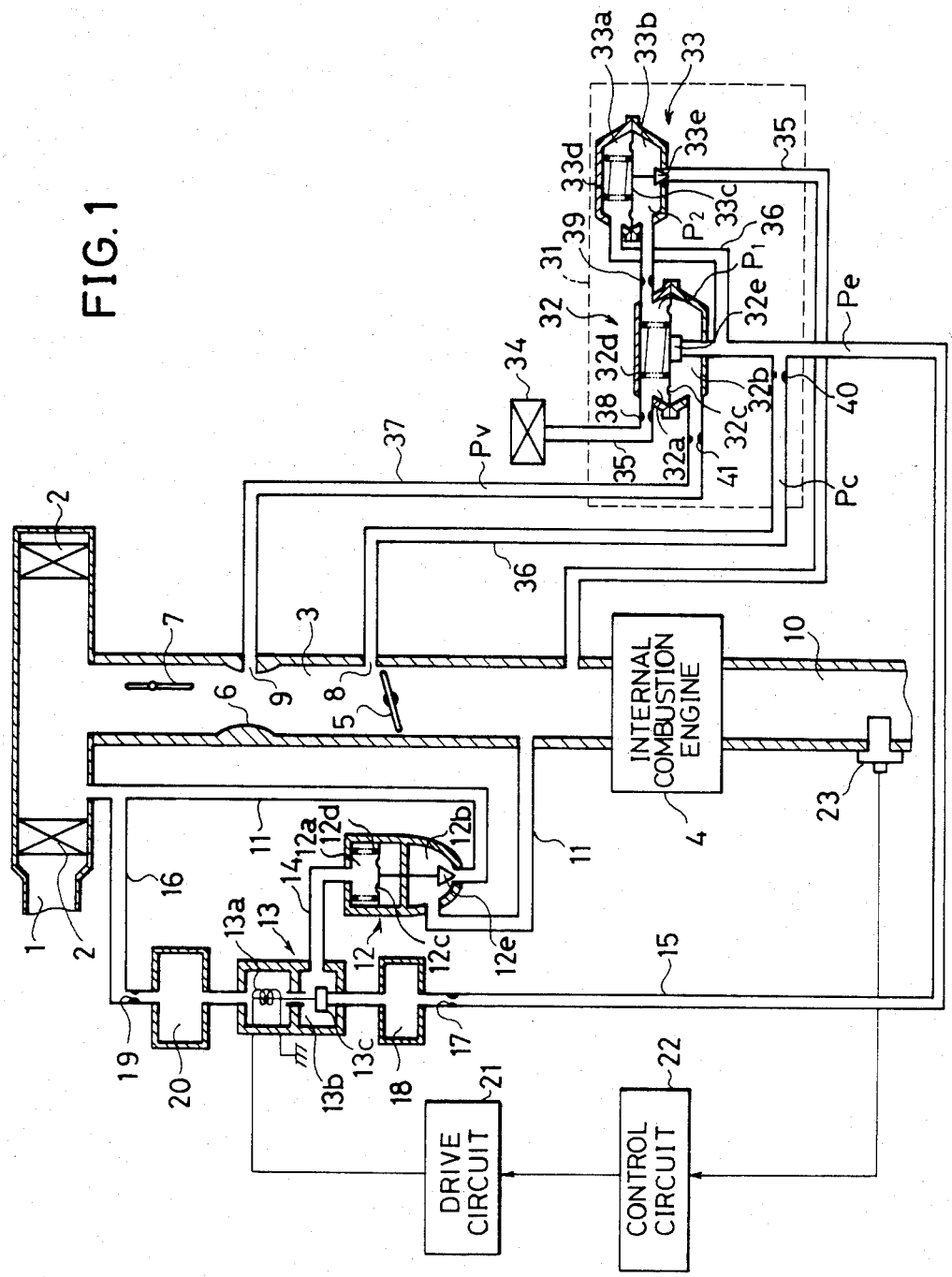
FIG. 1 is a schematic diagram illustrating a feedback control system for an internal combustion engine, according to the present invention.

Referring to FIG. 1, the first embodiment of the feedback control system for controlling the air/fuel ratio of an internal combustion engine, according to the present invention will be explained.

As shown, intake air taken from an air inlet port 1 is supplied to an internal combustion engine 4 via an air cleaner 2 and intake air passage 3. In the intake air passage 3, a throttle valve 5 is provided in the middle. Further, a venturi 6 is formed upstream from the throttle valve 5 and a choke valve is disposed upstream of the venturi 6. In the wall surface of the intake air passage 3, in proximity to the position of the throttle valve 5, a vacuum detection hole 8 is provided in such a manner that the vacuum detection hole 8 is located upstream from the throttle valve 5 when the throttle valve 5 is closed, and located downstream from the throttle valve 5 when the throttle valve 5 is opened. A second vacuum detection hole 9 is also provided to the venturi 6. A portion of the air intake system downstream of the throttle valve 5, i.e., the intake manifold is communicated with a portion around an air outlet port of the air cleaner 2 via an air intake side secondary air passage 11. In the secondary air passage 11, there is provided an air control valve 12 which consists of a vacuum chamber 12a, a valve chamber 12b acting as a part of the secondary air passage 11, a diaphragm 12c defining a wall of the vacuum chamber 12a, and a needle type valve element 12e placed in the valve chamber 12b and applied with a biasing force of a valve spring 12d via the diaphragm 12c so as to close the secondary air passage 11. With this construction, the cross sectional area of the secondary air passage 11 is increased as the magnitude of the vacuum acting upon the vacuum chamber 12a increases.

To the vacuum chamber 12a of the air control valve 12, there is applied a vacuum pressure from a three-way electro-magnetic valve 13 via a pressure passage 14. The electro-magnetic valve 13 includes a soleniod 13a, a valve chamber 13b communicated with the vacuum chamber 12a via the pressure passage 14, and a valve element 13c which is mounted in the valve chamber 13b and magnetically coupled with the solenoid 13a. The valve chamber 13b is communicated with a vacuum control part 31 which produces a first control pressure via a vacuum passage 15 for introducing the first control pressure, and also communicated with the part of the secondary air passage 11 upstream from the air control valve 12 via an atmospheric pressure passage 16 for introducing a second control pressure. When the soleniod 13 is not energized, the side of the vaccum passage 15 is closed and at the same time the pressure passage 14 and the atmospheric pressure passage 16 is communicated with each other via the valve chamber 13b. On the other hand, when the solenoid 13a is energized, the side of the atmospheric pressure passage 16 is closed and at the same time the pressure passage 14 and the vacuum passage 15 is communicated with each other.

The vacuum control part 31 consists of a vacuum responsive regulator valve 32 and an air valve 33 which consist of a vacuum chamber 32a or 33a, a diaphragm 32c or 33c, a valve spring 32d or 33d, and a valve element 32e or 33e respectively. The vacuum chamber 32a is disposed in the middle of a control air passage 35 which leads from an atmospheric air inlet port 34 with a filter to a part of the intake air passage downstream of the throttle valve 5, and the valve chamber 33b is disposed in the control air passage 35 downstream of the vacuum chamber 32a. The valve element 33e is applied with a resilient force of the valve spring 33d via the diaphragm 33c so as to close the control air passage 35. The vacuum chamber 33a is communicated with the vacuum detection hole 8 via a vacuum passage 36, and similarly, the valve chamber 32b is communicated with the vacuum detection hole 9 via a vacuum passage 37. The valve chamber 32b is communicated with the vacuum passage 36 and the valve element 32e is applied with a resilient force of the valve spring 32d via the diaphragm 32c so that the communication between the valve chamber 32b and the vacuum passage 36 is closed by the valve element 32e. In addition, in the control air passage 35, a pair of orifices 38 and 39 are provided respectively upstream and downstream of the vacuum chamber 32. Further, orifices 40 and 41 are provided in the vacuum passage 36 and the vacuum passage 37 respectively.

A part of the vacuum passage 36 of the side of the valve chamber 32b and the vacuum chamber 33a from the orifice 40, is communicated with the vacuum passage 15.

The vacuum passage 15 is provided with an orifice 17 and an accumurator 18 is formed on the side of the electro-magnetic valve 13 from the orifice 17.

The soleniod 13a is connected, via a drive circuit 21, to a control circuit 22. The control circuit 22 is connected with an oxygen sensor 23 which is disposed in an exhaust pipe 10 of the engine 4 and produces a voltage signal indicative of the oxygen contents in the exhaust gas of the engine.

The operation of the thus constructed fluid supply amount feedback control system according to the present invention will be explained hereinafter.

The operation of the vacuum control part 31 is as follows. When a vacuum Pc from the vacuum detection hole 8 is applied to the vacuum chamber 33a via the vacuum passage 36, in accordance with the operation of the engine, the valve element 33e is displaced in a direction to open the valve 33 if the vacuum pressure is greater than the resilient force of the valve spring 33d. By the opening of the air valve 33, outside air from the atmospheric air inlet port 34 is introduced to the intake air passage 3 at the downstream of the throttle valve 5, via the control air passage 35. The vacuum P1 and the vacuum P2 respectively in the vacuum chamber 32a and the valve chamber 33b through which the outside air travels, is determined in accordance with the aperture ratio of the orifices 38 and 39 respectively.

In this condition, if the differential pressure between the vacuum Pv from the vacuum detection hole 9, acting in the valve chamber 32b and the vacuum P1 is greater than the resilient force of the valve spring 32d, the valve element 32e is displaced in the direction to open the valve 32. By this opening of the control valve 32, a part of the vacuum Pv is directed to dilute the vacuum past the orifice 40 to produce a vacuum Pe acting in the vacuum chamber 12a when the electromagnetic valve 13 is activated.

Subsequently, due to the drop of the vacuum Pe, the opening degree of the air valve 33 is decreased to reduce the amount of the air flowing through the control air passage 35. By this reduction in the air flow amount, the vacuum P1 in the vacuum chamber 32a is reduced to close the control valve 32. Then the vacuum Pe is raised once more and the above sequential operations will be repeated. It is to be noted that the ratio between the vacuum Pv and the vacuum Pe becomes equal to the ratio between the vacuum P1 and the vacuum P2, since the speed of these repeating operations is very fast.

Therefore, when the amount of the main intake air of the engine is relatively small where the vacuum P1 is greater than Pv, the opening degree of the regulation valve 32 becomes large and the vacuum Pe becomes low. On the other hand, as the amount of the main intake air increases, the opening degree of the regulation valve 32 becomes smaller since the vacuum Pv increases, and consequently the vacuum Pe becomes high. Since the vacuum Pe acts in the vacuum chamber 12a as well as in the vacuum chamber 33a to open the air valve 33 and air control valve 12 during the actuation of the electro-magnetic valve 13, the amount of the air flowing through the control air passage 35 becomes proportional to the amount of the secondary air which flows through the air control passage 11 when the electro-magnetic valve 13 is activated. Similarly, the amount of the main intake air supplied to the engine 4 via the intake air passage 3 becomes proportional to the amount of the secondary air flowing through the secondary air passage 11 by the opening of the air control valve 12. As a result, the vacuum Pe has a value proportional to the amount of the main intake air to the engine and forms the first control pressure to be introduced into the intake air passage 3 of the engine 4 downstream of the throttle valve 5.

Figure 2:
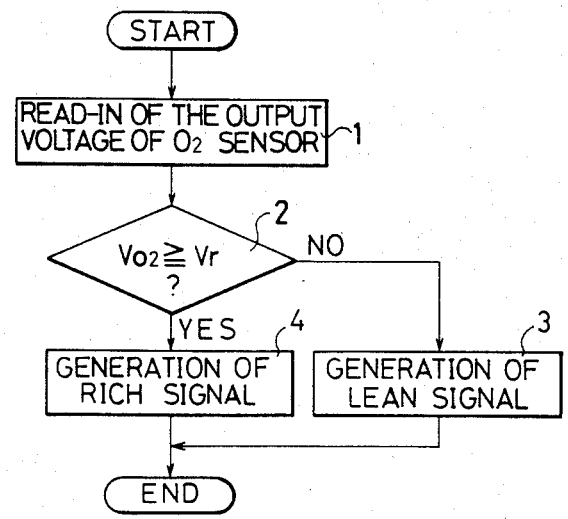
FIG. 2 is a flowchart showing the operation of the control circuit in the system of FIG. 1.

The operation of the control circuit 22 will be then explained with reference to the flowchart of FIG. 2.

When an ignition switch (not shown) is turned on and a power current is supplied to the control circuit 22, firstly the output voltage of the oxygen sensor 23 is read out by the control circuit 22. Since the oxygen sensor 23 is of the so-called flow-out type, the output voltage $VO_2$ thereof increases as the ambient condition becomes rich. After reading out of the output voltage $VO_2$, the air/fuel ratio of the mixture is determined at a step 2, from this output voltage $VO_2$.

In this determination step, whether the air/fuel ratio is rich or lean is determined by comparing the output voltage $VO_2$ of the oxygen sensor 23 with a reference voltage Vr which corresponds to a stoichiometric air/fuel ratio. If $VO_2 < Vr$, the air/fuel ratio is determined to be lean, and a lean signal is applied to the drive circuit 21 to shift the air/fuel ratio to the rich side, at a step 3. On the other hand, if $VO_2 \geq Vr$, the air/fuel ratio is determined to be rich, and a rich signal is applied to the drive circuit 21 to shift the air/fuel ratio to the lean side, at a step 4.

Thus, when the lean signal or the rich signal is applied to the drive circuit 21 from the control circuit 22, the drive circuit makes the electro-magnetic valve 13 inactivated by failing to supply the drive current of the solenoid 13a in accordance with the lean signal or makes the same activated by supplying the drive current of the soleniod 13a in accordance with the rich signal.

Assuming that the output signal of the control circuit 22 turns from the lean signal to the rich signal, the electro-magnetic valve 13 is then activated to close the side of the atmospheric pressure passage 16 and at the same time make communication between the pressure passage 14 and the vacuum passage 15. As a result, the vacuum in the accumurator 18 firstly acts in the vacuum chamber 12a, to immediately move the valve element 12e in the direction to open the valve 12 for a predetermined distance, and the secondary air begins to flow through the secondary air pasage 11. After that, the vacuum in the vacuum chamber 12a gradually approaches to the vacuum Pe because the vacuum Pe is supplied from the vacuum control part 31 to the vacuum chamber 12a via the orifice 17, and consequently the opening degree of the air control valve 12, i.e., the sectional area of the secondary air passage 11 gradually increases to increase the supply amount of the secondary air. When the vacuum in the vacuum chamber has reached to a value equal to the vacuum Pe, the amount of the secondary air flowing through the secondary air passage 11 becomes proportional to the amount of the main intake air, thus the secondary air whose amount is proportional to the main intake air amount is supplied to the engine 4.

Nextly, assuming that the output signal from the control circuit 22 turns from the rich signal to the lean signal, the electro-magneetic valve 13a is then inactivated and the side of the vacuum passage 15 is closed and at the same time, the pressure passage 14 is communicated with the atmospheric pressure passage 16. As a result, the vacuum in the accumurator 20 is firstly acts in the vacuum chamber 12a and the valve element 12e is immediately displaced in the direction to close the valve 12 for a predetermined distance. Then, the vacuum in the vacuum chamber 12a gradually approaches to the atmospheric pressure value because the atmospheric pressure is supplied to the vacuum chamber 12a via the orifice 19, to gradually reduce the sectional area of the secondary air passage 11 and also reduce the amount of the secondary air. When the pressure in the vacuum chamber has become equal to the atmospheric pressure, the air control valve 12 closes to block the secondary air passage 11, and the supply of the secondary air to the engine 4 is stopped.

Figure 3A:
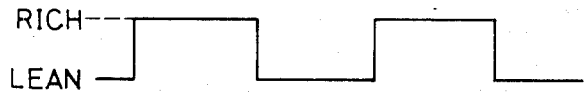
FIGS. 3A and 3B are graphs showing the manner of variation of vacuum in the vacuum chamber of the air control valve in the system of FIG. 1.
Figure 3B:
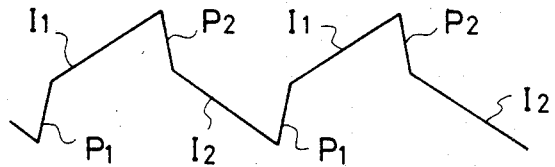

Accordingly, when the air/fuel ratio is to be controlled to the stoichiometric value, the rich signal and the lean signal are prodiced alternately as illustrated in FIG. 3A, and the vacuum in the vacuum chamber 12a varies as ilustrated in FIG. 3B. In FIG. 3B, P1 indicates a part corresponding to the proportional operation due to the pressure in the accumurator 18, I1 indicates a part corresponding to the integration operation via the orifice 17, and P2 indicates a part of proportional operaton due to the atmospheric pressure in the accumurator 20, and I2 indicates a part corresponding to the integraion operation via the orifice 19. Thus, the secondary air flowing through the secondary air passage 11 also has an amount which is the sum between a part of the proportional operation and a part of the integration operation, as shown in FIG. 3B.

Figure 4:
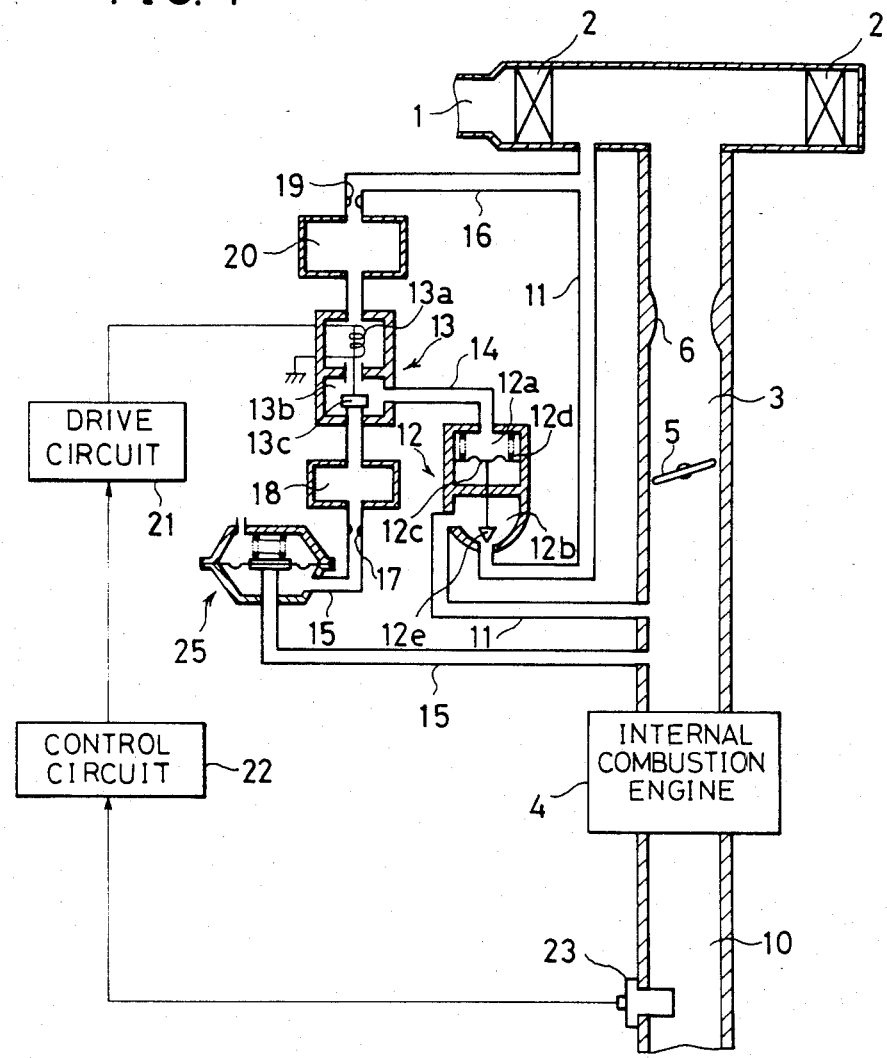
FIG. 4 is a schematic diagram illustrating a second embodiment of the feedback control system for an internal combustion engine according to the present invention.

FIG. 4 shows a second embodiment of the present invention in which the vacuum passage 15 is communicated with the downstream side of the throttle valve 5 and a part of the vacuum passage 15 on the side of the downstream of the throttle valve from the orifice 17 is provided with a constant vacuum control valve 25 which operates as a source of the first control pressure instead of the vacuum control part 31 of FIG. 1. The constant vacuum control valve 25 is designed to stabilize the vacuum of the downstream of the throttle valve to the vacuum Pr of the predetermined magnitude, when the magnitude of the former vacuum is greater than the latter. The other parts of the construction of this system is identical with the feedback control system of FIG. 1.

Figure 5:
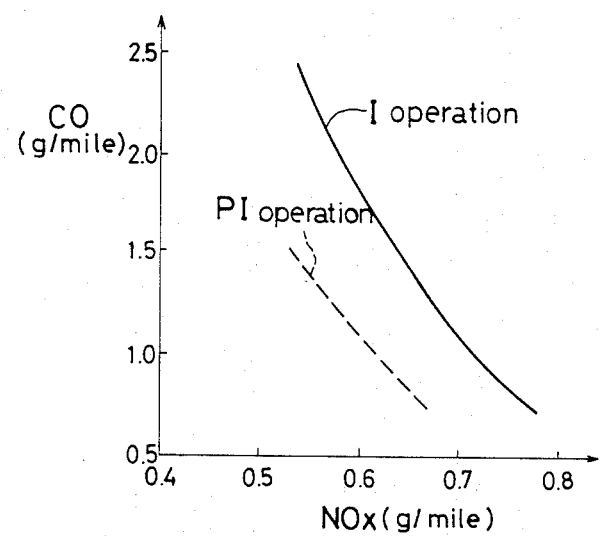
FIG. 5 is a graph showing the exhaust gas emission reduction performance obtained by the feedback control system according to the present invention.

FIG. 5 shows two curves each illustrating the relation between the amounts of noxious components (CO versus NOx) generated in the exhaust gas, at the parameter of the sectional area of the orifices 17 and 19, in which the curve for the air/fuel ratio control of the PI operation with the accumulators 18 and 20 is shown by the dashed line, and the curve for the air/fuel ratio control of the I operation without accumurators is shown by the solid line.

As will be understood from the foregoing, in the case of the feedback control system according to the present invention, the fluid supply amount control of the pneumatic type PI operation, is enabled because at least one of the part of the first pressure passage of the side of the pressure chamber from said first orifice and the part of the second pressure passage of the side of the pressure chamber from said second orifice is provided with an accumulator.

Therefore, in the above case of the secondary air control in an internal combustion engine, the construction of the system has simplified as compared with the conventional system which performs the PI operation by the use of a pulse motor. Thus, the cost of the system has been lowered relative to the conventional system. Further, as compared with a pneumatic type system which performs only the integral operation, the efficiency of the reduction of emission has been improved as shown in FIG. 5 because the period of inversion of the direction of the air/fuel ratio control is shortend without increasing the lift amount of the valve element.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention. As an example, in the case of the feedback control system of an internal combustion engine according to the present invention, the method of control is not limited to the above explained control of the flow of the secondary air, and the system can be adapted to such a type as the control of the amount of the air traveling through the air bleed of the carburetor or the amount of the fuel traveling through the fuel passage of the carburetor, by means of a valve actuated in response to the pressure of the fluid.

Further, the feedback control system according to the present invention characterized by the PI operation, can be adapted not only for the internal combustion engine but also for a fluid supply control system in a chemical process, such as the control of the supply of molten glass to the sheet glass production process.

What is claimed is:

1. A feedback control system for controlling the amount of a fluid supplied to an apparatus operable with the fluid, whose operational state varies with the amount of the fluid supplied thereto, said amount of the fluid is controlled in accordance with a detected result of the operational state of the apparatus, comprising:
    a detection means for detecting said operational state of the apparatus and producing a detection signal which can take a first level and a second level respectively indicative of first and second operational states of said apparatus;
    a valve means disposed in a fluid passage connected to said appratus, for varying a sectional area of said fluid passage in accordance with a magnitude of a pressure of a fluid supplied to a pressure chamber thereof;
    a first control pressure generating means for generating a first control pressure;
    a second control pressure generating means for generating a second control pressure different from said first control pressure;
    control means for supplying said first control pressure to said pressure chamber via a first pressure passage when said detection signal is in the first level, and supplying said second control pressure to said pressure chamber via a second pressure passage when said detection signal is in the second level;
    first and second orifices respectively provided in said first and second pressure passages; and
    an accumulator provided in at least one of a part of said first pressure passage on the side of said pressure chamber from said orifice and a part of said second pressure passage on the side of said pressure chamber from said second orifice.

2. A feedback control system as set forth in claim 1, wherein said apparatus is an internal combustion engine and said detection means is an oxygen sensor (23) disposed in an exhaust system of said internal combustion engine for generating an output signal indicative of oxygen content in an exhaust gas of said internal combustion engine.

3. A feedback control system as set forth in claim 1, wherein said apparatus is an internal combustion engine and said valve means is an air valve (12) disposed in an air intake side secondary air passage which communicates with a part of an intake air passage of said internal combustion engine downstream from a throttle valve (5).

4. A feedback control system as set forth in claim 1, wherein said apparatus is an internal combustion engine and said first control pressure generating means is a pressure regulating means (31) communicated with an intake air passage (3) of said internal combustion engine, which generates, as the first control pressure, a vacuum whose magnitude is proportional to an intake air amount.

5. A feedback control system as set forth in claim 4, wherein said first control pressure generating means (31) comprises:
    a first vacuum passage (36) extending from a part of said intake air passage in proximity or downstream of a throttle valve (5);
    a second vacuum passage (37) extending from inside of a venturi (6) formed in said intake air passage;
    a control intake air passage (35) leading from an air inlet port (34) to downstream of said throttle valve;
    a vacuum responsive regulation valve (32) having a first vacuum chamber (32a) disposed in the middle of said control intake air passage and a first valve chamber (32b) communicated with said second vacuum passage, for making communication between said first vacuum passage (36) and said second vacuum passage (37) through said first valve chamber (32b) in accordance with a pressure difference between said first vacuum chamber and said first valve chamber; and
    a vacuum responsive air control valve (33) having a second vacuum chamber (33a) communicated with said first vacuum passage and a second valve chamber (33b) disposed in the middle of said control intake air passage downstream of said first vacuum chamber (32a), for providing a communication through said control intake air passage (35) at an opening degree corresponding to a pressure difference between said second vacuum chamber (33a) and said second valve chamber (33b), so as to provide a vacuum in said first vacuum passage (36) acting in the second vacuum chamber, as said first control pressure.

6. A feedback control system as set forth in claim 1, wherein said first control pressure generating means is a source of a constant vacuum pressure.

7. A feedback control system as set forth in claim 1, wherein said apparatus is an internal combustion engine and said first control pressure generating means is a constant vacuum control valve (25) connected with an intake manifold of said internal combustion engine.

* * * * *